US010253800B2

United States Patent
Sarazin et al.

(10) Patent No.: US 10,253,800 B2
(45) Date of Patent: Apr. 9, 2019

(54) SYSTEM FOR REPAIRING A FASTENER EQUIPPING A REACTOR WALL

(71) Applicant: Safran Aircraft Engines, Paris (FR)

(72) Inventors: Yann Christophe Maurice Sarazin, Paris (FR); Simon Pierre Claude Charbonnier, Vert Saint Denis (FR); Patrick Jean-Louis Reghezza, Vaux le Penil (FR); Julien Roset, Paris (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 15/536,479

(22) PCT Filed: Dec. 14, 2015

(86) PCT No.: PCT/FR2015/053463
§ 371 (c)(1),
(2) Date: Jun. 15, 2017

(87) PCT Pub. No.: WO2016/097552
PCT Pub. Date: Jun. 23, 2016

(65) Prior Publication Data
US 2017/0343033 A1   Nov. 30, 2017

(30) Foreign Application Priority Data
Dec. 15, 2014   (FR) ...................... 14 62434

(51) Int. Cl.
*F16B 37/04*   (2006.01)
*F01D 25/28*   (2006.01)
(Continued)

(52) U.S. Cl.
CPC ............ *F16B 37/042* (2013.01); *B64D 29/06* (2013.01); *F01D 25/28* (2013.01); *F02C 7/00* (2013.01);
(Continued)

(58) Field of Classification Search
CPC ...... F16B 37/042; F16B 37/044; F16B 19/02; F01D 25/28; F05D 2260/33
See application file for complete search history.

(56) References Cited

U.S. PATENT DOCUMENTS 4,981,735 A * 1/1991 Rickson .................... F16B 5/01
156/92
5,037,259 A * 8/1991 Duran .................. F16B 37/062
411/173
(Continued)

FOREIGN PATENT DOCUMENTS

EP   2 325 443 A2   5/2011
EP   2 518 282 A2   10/2012
(Continued)

OTHER PUBLICATIONS

Search Report issued in French Patent Application No. 1462434 dated Oct. 29, 2015.
(Continued)

*Primary Examiner* — Adriana Figueroa
(74) *Attorney, Agent, or Firm* — Pearne & Gordon LLP

(57) ABSTRACT

An attachment system intended to equip a wall, the system including a nut intended to receive a screw of which the orientation is normal to the wall, the screw passing through an element such as an outer panel in order to attach the element to the wall. The attachment system comprises a socket having a threaded cylindrical outer face intended to be screwed into a hole passing through the wall and having dimensions greater than the dimensions of the fastener that the repair socket replaces, the socket carrying, in the central region of same, a nut receiving the screw.

12 Claims, 5 Drawing Sheets

(51) Int. Cl.
    *F02C 7/00* (2006.01)
    *F16B 5/06* (2006.01)
    *F16B 19/02* (2006.01)
    *F16B 33/00* (2006.01)
    *B64D 29/06* (2006.01)
    *B64D 33/02* (2006.01)

(52) U.S. Cl.
    CPC .............. *F16B 5/065* (2013.01); *F16B 19/02* (2013.01); *F16B 33/002* (2013.01); *F16B 37/044* (2013.01); *B64D 2033/0273* (2013.01); *F05D 2230/80* (2013.01); *F05D 2260/33* (2013.01); *F05D 2260/36* (2013.01); *Y02T 50/672* (2013.01)

(56) References Cited

U.S. PATENT DOCUMENTS

| | | | | |
|---|---|---|---|---|
| 5,468,104 | A * | 11/1995 | Reid | F16B 21/186 411/113 |
| 7,588,386 | B2 * | 9/2009 | Kielczewski | F16B 5/0233 248/188.4 |
| 8,607,577 | B2 * | 12/2013 | Ruberte Sanchez | F01D 25/00 16/2.1 |
| 8,864,432 | B2 * | 10/2014 | Figge | F16B 5/025 411/383 |
| 9,255,548 | B2 * | 2/2016 | Preston, III | F02K 1/822 |
| 2002/0098063 | A1 * | 7/2002 | Pinzl | F16B 37/042 411/544 |
| 2007/0297869 | A1 * | 12/2007 | Kunda | F16B 5/025 411/108 |
| 2014/0069106 | A1 | 3/2014 | Preston, III | |

FOREIGN PATENT DOCUMENTS

| | | |
|---|---|---|
| GB | 2 428 762 A | 2/2007 |
| JP | H08-188098 A | 7/1996 |

OTHER PUBLICATIONS

International Search Report issued in Application No. PCT/FR2015/053463 dated Mar. 8, 2016.

Written Opinion issued in Application No. PCT/FR2015/053463 dated Mar. 8, 2016.

* cited by examiner

SYSTEM FOR REPAIRING A FASTENER EQUIPPING A REACTOR WALL

TECHNICAL DOMAIN

The invention relates to the attachment of panels to a twin spool turbojet type engine shell fitted with discharge valves or gates capable of creating a communication between the two flows, these discharge valves or gates opening up through the wall of this shell, the panels covering this shell being spaced at a distance from each other.

STATE OF THE PRIOR ART

A twin spool turbojet 1 like that shown in FIG. 1, comprises an intake duct 2 into which air enters to be drawn into a fan 3, before being divided into a central core engine flow and a fan flow surrounding the core engine flow.

The core engine flow then passes through a low pressure compressor 4 while the fan flow is forced backwards to generate a thrust. The core engine flow then passes through a high pressure compressor 6 before reaching a combustion chamber 7 and is then expanded in a high pressure turbine 8 and then in a low pressure turbine 9, before being expelled.

Each turbine and each compressor comprises blades supported on a central shaft or rotor 11 oriented along a longitudinal axis AX and being supported by an intermediate case 12 that surrounds it. This intermediate case 12 is retained by radial arms 13 that connect it to a main case 14 that surrounds it.

More specifically, the core engine flow circulates in an annular space delimited on the inside by the rotor 11 and on the outside by the intermediate case 12, and the fan flow circulates in another annular space delimited on the inside by the intermediate case and on the outside by the main case 14.

After passing through the fan, the fan flow 3 is straightened by a series of fixed blades 16 supported by a cylindrical shell that extends prolonging the intermediate case 12 towards the fan, these fixed blades thus being upstream from the radial arms 13 supporting the intermediate case.

The shell is shown in FIG. 2 with reference 17, and comprises an offset downstream from the blades 16 that it supports, delimited by a circular rim 18. The diameter of the portion of the shell 17 downstream from this rim, denoted 19, is thus less than the diameter of the upstream shell portion.

This downstream portion 19 of the shell supports a series of panels, not shown, each of which extends from the rim 18 as far at two radial arms 13 retaining the intermediate case. Each panel is retained by several fasteners of the type of fastener 21 at a distance from the outside face of the downstream portion 19 of the shell, such that these panels prolong the upstream portion of the shell.

These panels cover openings into which discharge gates open up, that are open under some situations to evacuate air directly from the core engine flow to the fan flow, particularly to prevent a turbojet surging phenomenon from occurring.

These panels also delimit an internal flow surface for the fan flow that prolongs the upstream portion of the shell so as to not disturb this fan flow while allowing evacuation of air from the core engine flow through the discharge gates, this air being evacuated in a region downstream from the panels.

The fastener 21 retaining such a panel comprises a hole 22 passing through the wall of the shell, and a cage nut held in place by a tab fixed by two rivets or similar means 23 to be located facing this hole 22. The panel is fixed to this fastener 21 by means of a screw passing in sequence through this panel and a circular washer that creates a space between the panel and the outside face of the downstream portion of the shell.

Considering vibrational constraints and the operating environment, the panel retaining screw tends to come loose, which causes ovalling of the hole 22 that can lead to destruction of the cage inside which the nut 24 is kept floating, and damage to the contact surface around this hole in the region of the fastener One purpose of the invention is to disclose a method of fastening such a panel that is easy to install in a shell, firstly on a new engine and secondly on an existing engine to replace a damaged fastener.

PRESENTATION OF THE INVENTION

The invention relates to an attachment system designed to be fitted on a turbomachine wall, comprising a floating nut into which a screw in the direction normal to the wall will be fitted, this screw passing through an element such as a panel to fix this element to the wall, this attachment system comprising a bushing comprising a bushing body supporting the floating nut, the bushing body comprising a threaded cylindrical portion to be fixed by screwing in a hole passing through the wall, the floating nut being fixed to the bushing body and prevented from rotation about its screwing axis relative to the bushing body while having limited mobility for degrees of freedom other than rotation about its screwing axis.

With this arrangement, the installation of an attachment consists mainly of drilling the shell and fitting the bushing in this shell simply by screwing.

Another purpose of the invention is a system thus defined in which the bushing body comprises an external rim that bears on a face of the wall in which this bushing body is fitted, to form a bearing for tightening the bushing body in contact with the wall.

Another purpose of the invention is a system thus defined in which the cylindrical external face of the bushing is provided with a self-tapping type thread.

Another purpose of the invention is a system thus defined in which the bushing body comprises an internal toroidal space delimited by a wall comprising a central opening in which radial notches are formed and in which the nut comprises radial arms that can be positioned to coincide with the notches of the opening to engage the nut through this opening before it is partially turned to prevent axial movement inside the bushing body.

Another purpose of the invention is a system thus defined, comprising one or several blocking pads each of which engages in a notch in the bushing body to prevent the nut from rotating in the internal space in this bushing body.

Another purpose of the invention is a system thus defined, comprising a threaded ring screwing onto the threaded cylindrical portion of the bushing body to tighten the wall of the shell between the bushing body and the ring.

Another purpose of the invention is a system thus defined, comprising a caged nut including a cage containing the floating nut, this cage being screwed into a central threaded hole in the bushing body.

Another purpose of the invention is a system thus defined, in which the cage is prevented from rotating in the bushing body by at least one key force fitted into an external longitudinal groove in the cage, this key chiseling into the threads of the threaded hole when it is inserted once the cage is in position in the bushing body.

Another purpose of the invention is a turbojet type aircraft engine comprising a turbomachine fitted with an attachment system according to one of the previous claims to hold an internal panel in position.

Another purpose of the invention is a method of repairing a fastener fitted on a turbomachine wall, this fastener including a nut into which a screw will be fitted in the direction normal to the wall, this screw passing through an element such as a panel to fix this element to the wall, this method including the following steps:

provide an attachment system conforming with that defined above;

drill a hole in the wall sized to correspond to the threaded cylindrical portion of the bushing of said system, fix the bushing by screwing into the hole so that the screw can be screwed in the nut floating in said system when this screw passes through the element to fix this element to the wall.

DETAILED PRESENTATION OF PARTICULAR EMBODIMENTS

The basic concept of the invention is to drill a relatively large diameter hole into the shell wall to fix a bushing with a corresponding diameter into this hole that holds a nut in its central region into which the panel attachment screw will fit.

The bushing diameter is advantageously larger than the diameter of typical existing fasteners, to simplify repair by replacement. Thus, the repair of an existing fastener consists of drilling a hole with an appropriate diameter surrounding this fastener to jointly remove this fastener and form a receptacle into which the new attachment system fits to replace the existing fastener.

Figure 1:
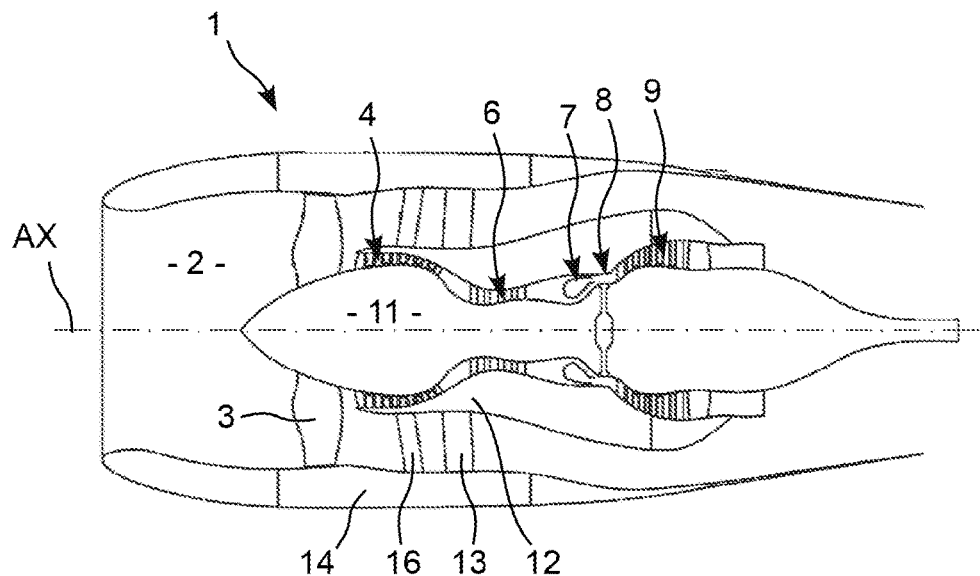
FIG. 1, already described, is a sectional view of a twin spool turbojet.
Figure 2:
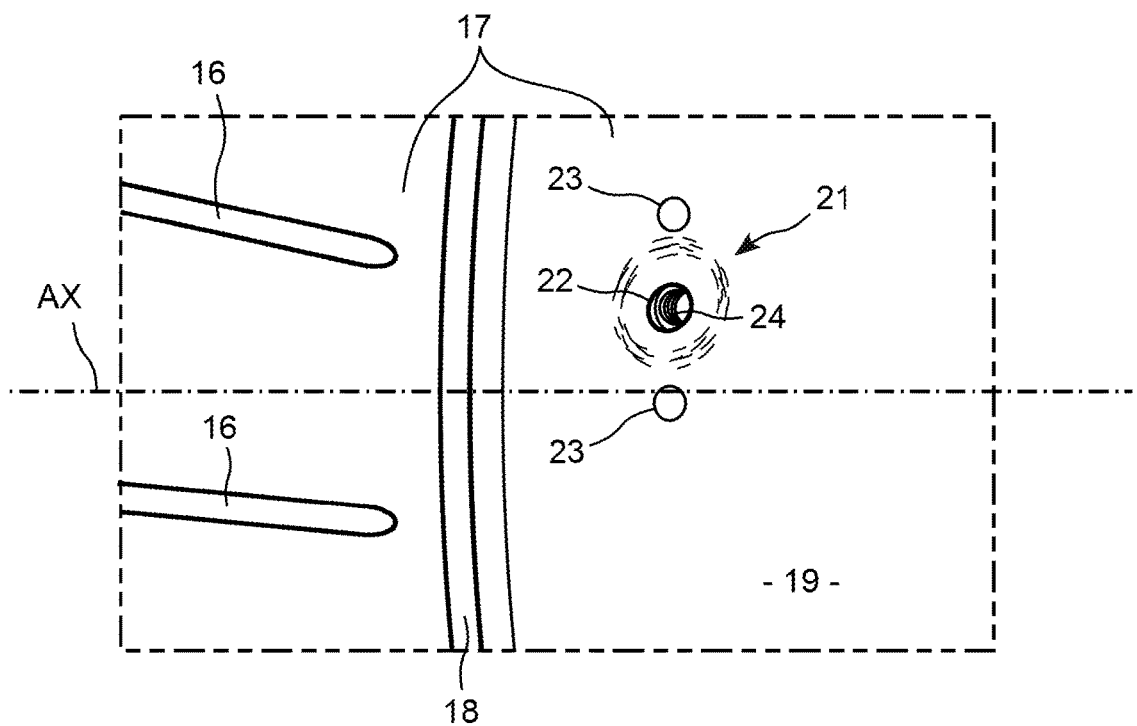
FIG. 2, already described, is a front view of a shell comprising a fastener that needs to be repaired.
Figure 3:
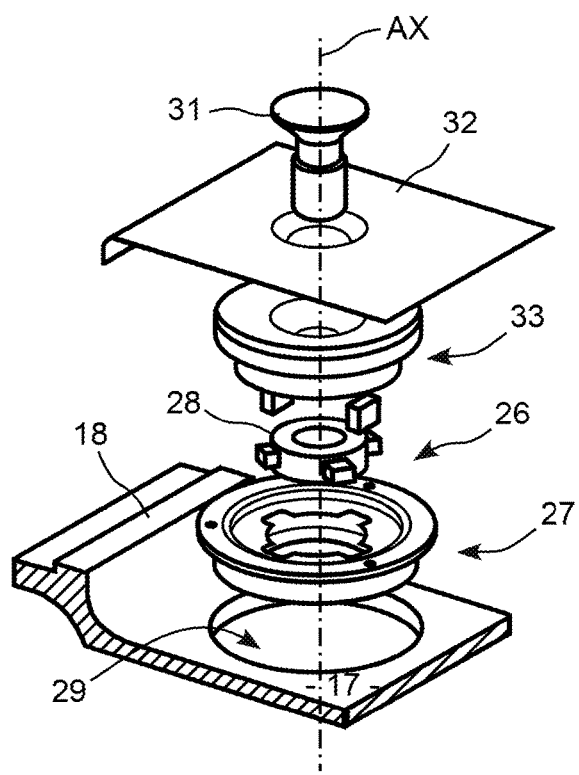
FIG. 3 is an exploded view showing the components of an attachment system according to a first embodiment of the invention and a portion of shell into which this system will be fitted and a spacer and a panel that will be installed on this shell.
Figure 4:
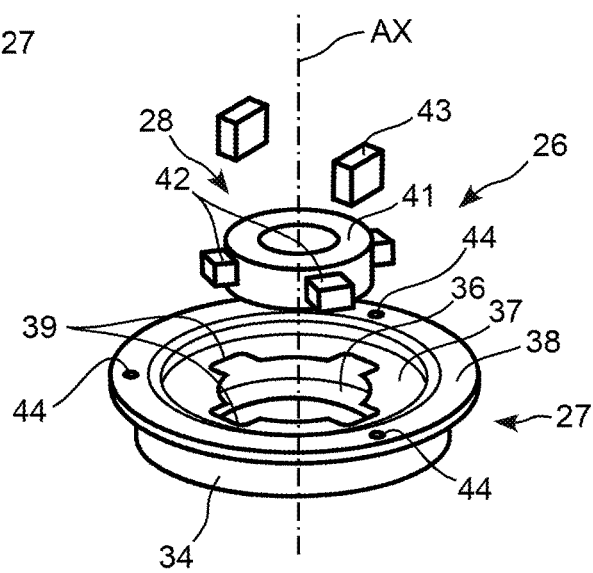
FIG. 4 is an exploded view showing the components of the attachment system according to the first embodiment of the invention.
Figure 5:
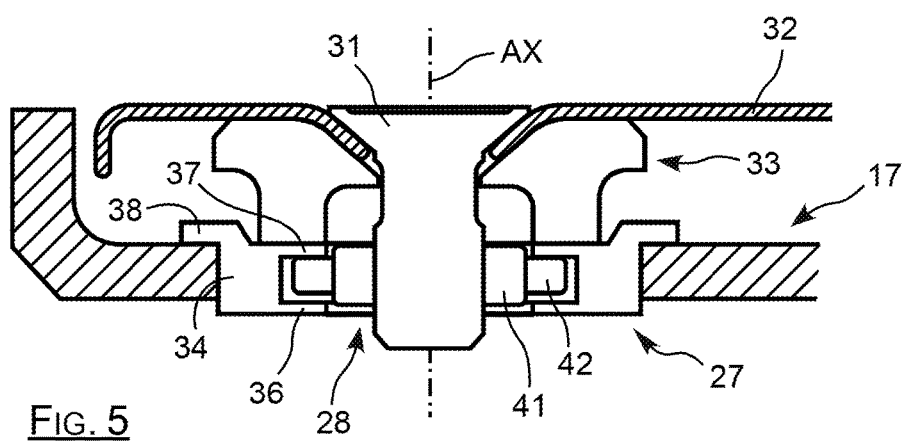
FIG. 5 is a sectional view of the attachment system according to the first embodiment of the invention installed in a shell and a panel with a spacer fixed to this shell through a screw engaged in this attachment system.

In the first embodiment shown on FIGS. 3 to 10, the bushing that is denoted as 26 comprises a principal body 27 into the central part of which a nut 28 fits that in this case in interchangeable and floating, as can be seen on FIGS. 3 to 5.

This bushing 26 will be screwed into a drilling 29 that passes through the wall of the shell 17 at a fastener to be replaced, that is not shown on the figures. The central nut 28 of this bushing 26 will hold an attachment screw 31 that passes in sequence through a panel 32 and a spacer 33 to hold this panel 32 in position at a distance from the external face of the shell 17.

The bushing body 27 that is shown more clearly in FIG. 4 comprises an external cylindrical wall 34, the two circular edges of which are each prolonged radially inwards in a plane ring-shaped wall, these two walls being denoted 36 and 37.

The cylindrical wall 34 has an external face threaded to advantageously be self-tapping, and on its internal face it cooperates with walls 36 and 37 to jointly delimit an annular internal space that will contain and retain the nut 28.

The circular edge of the cylindrical wall 34 that is prolonged inwards by the wall 37 is also prolonged radially outwards by a circumferential rim or wall 38 with an outside diameter larger than the outside diameter of this cylindrical wall 34. This rim 38 form a stop against which the bushing is tightened when it is screwed into the drilling 29 to block it in position in contact with the outside face of the shell wall.

The shell wall 36 comprises a circular internal edge, while the opposite plane wall, namely the wall 37, has an internal edge with a shape based on a circle but provided with four recesses or notches 39 each extending in the radial direction towards the cylindrical wall 34. As can be seen on FIG. 4, these four recesses are equally spaced at ninety degrees from each other about the axis of revolution AX of the bushing body 26.

A top view of the nut 28 shows an external contour with the same shape as the contour of the internal opening of the wall 37 but with slightly smaller dimensions so that it can fit through this central opening.

This nut 28, that is shown more clearly in FIG. 4, comprises a toroidal principal body 41 of which the internal cylindrical face is threaded and of which the diameter of the external cylindrical face is slightly smaller than the internal diameter of the wall 37.

This nut comprises four arms 42 that project radially from the outside face of its body 41, these arms 42 being distributed uniformly around the axis AX at a spacing of ninety degrees from each other around this axis. As can be seen on the figures, the dimensions of each arm 42 are slightly smaller than the dimensions of the recesses 39 in the plane ring wall 37. The thickness of each arm 42 is also slightly less than the distance separating the inside faces of the walls 36 and 37 along the AX axis, as can be seen in FIG. 5.

Placement of the nut 28 in the bushing body 26 thus consists of presenting it facing the upper wall 37 with its arms 42 facing the recesses 38 to engage it inside the bushing body until its arms 42 come into contact with the inside face of the plane ring wall 36. The nut 28 can then be pivoted by about an eighth of a turn so that each of its arms is positioned between two consecutive recesses 39 such that it is retained in position by the wall 36 so that it is fully trapped in the bushing body 27.

At this stage, blocking pads 43 can be engaged in at least two of the four recesses 39 to prevent rotation of the nut 28 by more than a quarter of a turn in the bushing body, so that it is blocked in position trapped in this bushing body. These pads may be made of an elastomer material, or a composite or even metallic material.

The nut 28 thus mounted is floating in the bushing body, it is blocked in rotation about its screwing axis that coincides with the AX axis in the figures, and its mobility is limited for the remaining degrees of freedom, namely two rotations and three translations. Due to this mobility, in particular the nut can be inclined so that a screw with an orientation significantly different from the orientation of the AX axis can be fitted in it.

It is also close to the central region of the bushing body, the outside diameter of which is significantly more than that of the bushing body, while remaining at the same level as the shell wall when the assembly is installed.

Figure 6:
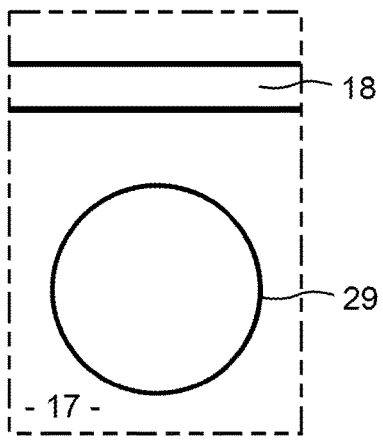
FIG. 6 is a front view of a shell comprising a drilling into which an attachment system according to the first embodiment of the invention will be fitted to replace a damaged panel fastener.

Installation of the attachment system according to the invention into a shell 17 thus consists firstly of making a drilling 29 in the wall of this shell, as shown on FIG. 6, with a diameter corresponding to the diameter of the bushing.

When repairing an existing fastener, the hole is made around this fastener to remove this fastener and at the same time form a receptacle into which the new attachment system can be fitted to replace the existing fastener.

This drilling is done with a special tool designed to recover the drilled plug with the fastener to be replaced in it, so that none of the removed elements can drop behind the drilled wall. This special tool comprises for example a bell saw type cutting element coupled to a pneumatic suction system.

Once this drilling 29 has been made, it is tapped either with a special tap or directly with the bushing body 27 that can be designed to be self-tapping. This tapping makes a thread that has a sufficiently fine pitch so that several threads can be formed over a depth equal to the thickness of the wall forming the shell.

Figure 7:
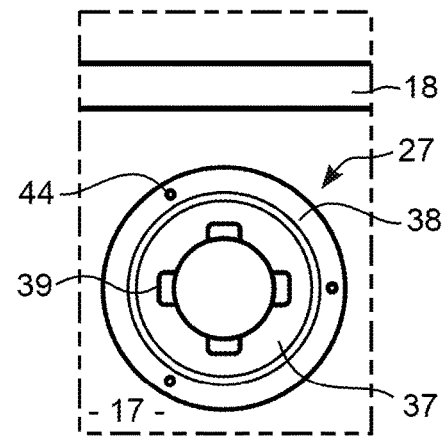
FIG. 7 is a front view of the shell in FIG. 5 in the drilling of which a bushing body of the system according to the first embodiment of the invention has been installed.

This bushing body is then screwed into the drilling 29 and tightened and locked in position in the drilling, which is the stage shown in FIG. 7. As can be seen on the figures, the bushing body 27 comprises three holes 44 made at its rim 38, at a spacing of one hundred and twenty degrees from each other around the AX axis. These holes 44 are designed to hold a corresponding tool with a head fitted with pins that engage in these three holes to drive the bushing body 27 in rotation in the hole 29 to tighten and/or tap the internal face of this hole 29.

As can be seen more clearly on FIG. 5, the dimensions are chosen such that when the bushing body is in place and is tightened onto the shell wall, the outside face of the plane wall 37 is flush with the outside face of the shell on which the edge 38 bears when tightened. In other words, when the bushing is in place, it is flush with the outside surface of the shell; only the edge 38 projects very slightly from this outside surface, so as not to disturb the aerodynamic flow in the region of the repair.

During operation, when the panel is installed, the spacer 33 bears directly on the outside face of the wall 37 of the bushing. When this attachment system is used to repair an existing fastener, this wall 37 of the bushing is at the location of the portion of shell that was damaged by the defective fastener.

Figure 8:
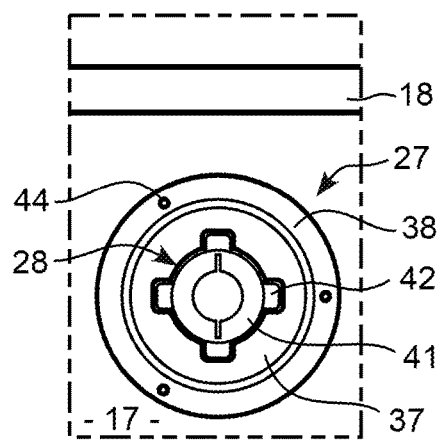
FIG. 8 is a front view showing the shell in FIG. 5 fitted with the bushing body of the system according to the first embodiment of the invention in which a floating nut according to the invention has been engaged.

When the bushing body 27 is in position and is blocked, the removable nut 28 is presented in front of the face 37 so that it can be engaged in this bushing body, as shown in FIG. 8.

Figure 9:
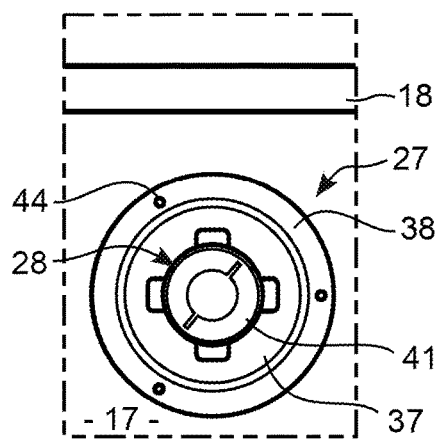
FIG. 9 is a front view showing the shell in FIG. 5 fitted with the bushing body with its floating nut as it is being blocked.

Once the nut 28 is in position in the bushing body 27, the operator makes it pivot by about an eighth of a turn to shift the radial arms 42 correspondingly from the recesses 39, so that this nut can be trapped in the bushing body, corresponding to the situation shown in FIG. 9.

Figure 10:
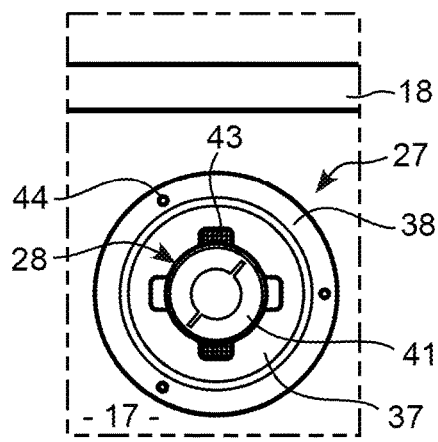
FIG. 10 is a front view showing the shell in FIG. 5 fitted with the bushing body with its floating nut blocked in position in this bushing body in accordance with the first embodiment of the invention.

The fixing pads 43 can then be inserted in two of the recesses 39 so as to block the nut trapped in the bushing body, corresponding to the situation in FIG. 10. Holding the nut in place by elastomer pads also damps vibrations, which is particularly useful when there are strong vibration constraints in the environment.

At this stage, the nut is blocked in the bushing body such that the attachment system is fixed in position, so that a panel 32 and its spacer can be installed and so that a clamping screw 31 can then be fitted through this panel and this spacer. This screw 31 is then tightened in the nut 28, so that the panel 32 can be completely fixed at a distance from the external wall of the shell.

In general, the hole 29 can be drilled and the tapping can be made and the bushing 26 put into place entirely from the outside face of the shell wall 17, without needing to access the inside face of this shell in which the attachment to be replaced is located. This operation can be done with no risk of losing a component in the region located behind the shell wall, called the inter-flows space.

Under these conditions, a damaged fastener can be repaired without completely removing the engine on which the fastener is to be replaced at the shell prolonging its intermediate case; this shell and the intermediate case can be accessed when the engine is under the wing, without separating this engine from the wing of the aircraft on which it is installed.

As mentioned above, the dimensions of the nut are slightly smaller than the dimensions of the central opening in the wall 37. In particular, the outside diameter of its main toroidal-shaped body 41 is significantly less than the inside diameter of this opening, and the thickness of the tabs or the radial arms 42 is less than the distance between the inside faces of the walls 36 and 37.

The nut 28 can be removed from the bushing to be replaced, for example if its internal thread is damaged, without needing to remove the bushing. Replacement of such a nut then consists of removing the blocking pads 43, and pivoting the nut to put its radial arms into position facing the corresponding recesses so that it can be extracted along the axial direction. A new nut can then be installed using the procedure described for FIGS. 6 to 10.

In a less expensive approach it would also be possible to provide a bushing that traps a nut that cannot be removed, in other words a non-replaceable nut.

This attachment system can be installed on a new or worn shell is possible with access only to the outside face of the shell All that is necessary is then to make a tapped hole with the appropriate diameter in this shell so that the bushing of the system can be screwed into it and tightened in this tapped hole.

Furthermore, the attachment system according to the invention can be used to repair a damaged fastener, but as mentioned above, it can also be installed directly, on other words it can be fitted on a new jet engine shell.

In the second embodiment shown on FIGS. 11 to 17, the bushing denoted as 46 comprises a principal body 47 into the central part of which an interchangeable nut 48 fits, and onto the external threaded periphery of which a tightening ring 49 fits.

This bushing 46 will be engaged in a drilling 51 passing through the wall of a shell 52, into the central nut 48 of which fits an attachment screw passing through a spacer and a panel to be held at a distance from this shell.

The bushing body 47 that is formed from a single part derived from casting and/or machining is in the general form of a part of revolution about an axis AX perpendicular to the wall of the shell when the bushing is in place. This body 47 comprises a toroidal base 53 with a square cross-section with one face prolonged by a tubular portion 54 fixing it to the shell, and an opposite face prolonged by a floating nut support portion 56. The complementary external periphery of this toroidal base 53 is prolonged radially in a bearing rim 57 that extends around about half the circumference of the bushing body.

The radial thickness of the tubular attachment portion 54 is significantly less than the thickness of the base 53 along the radial direction. The outside face 58 of this tubular portion that coincides with the outside face of the base 53, is threaded on the outside so that a clamping ring 49 can be fitted on it.

Figure 13:
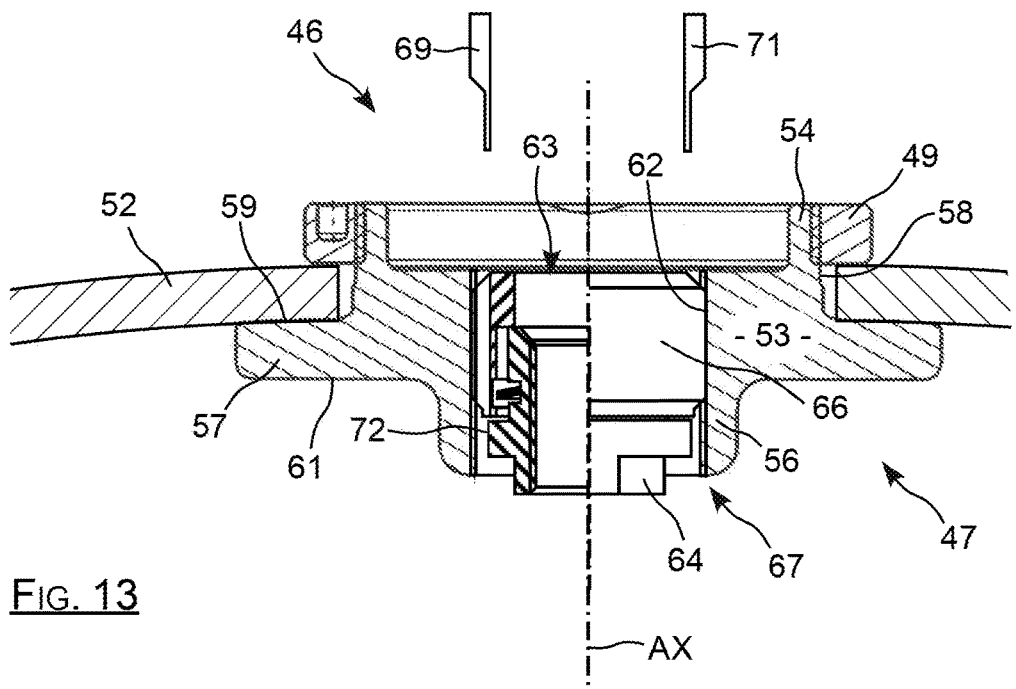
FIG. 13 is a sectional view of the attachment system according to the second embodiment of the invention installed in a shell.

As can be seen on FIG. 13, when the bushing body 47 is in place, the tubular attachment portion 54 is engaged in the hole 51 and the clamping ring 49 is screwed and is tightened in the thread of the outside face 58, so that the wall of the shell 52 can be firmly tightened between the rim 57 and this tightening ring 49. This bearing ring thus forms a stop onto which the bushing can be tightened when it is screwed into the drilling.

The length of the tubular attachment portion 54 along the AX axis corresponds approximately to the thickness of the ring 49, and the thickness of the toroidal base 53 along the AX axis is equal to about twice the thickness of the wall forming the shell 52.

The thickness of the bearing rim 57 along the AX axis corresponds to the thickness of the wall forming the shell 52, in other words it is equal to about half the thickness of the toroidal base 53 along the AX axis. This rim 57 is delimited by a bearing face 59 extending along a median plane for the base 53 and by an opposite face 61 that coincides with and/or prolongs the plane face of the toroidal base 53 from which the tubular portion 56 projects.

As can be seen on FIG. 13, the tubular portion 56 is delimited on the inside by a tapped cylindrical internal face 62 that extends through the entire thickness of the bushing body along the AX axis to delimit a tapped central hole 63 into which a cage 66 is screwed holding the floating nut 64.

This cage 66 contains two longitudinal grooves on its threaded cylindrical external face, in other words extending parallel to its axis of revolution, and that are located at diametrically opposite positions around this axis, one of which is shown on the figures and being denoted on them as reference 68.

Figure 14:
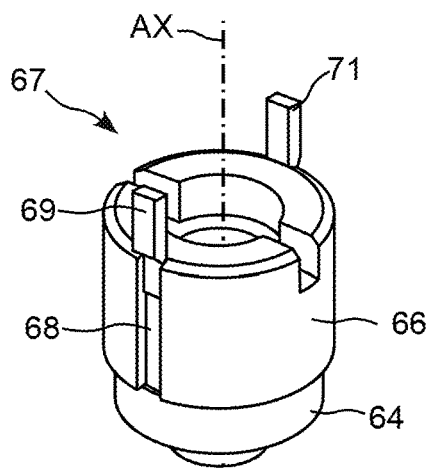
FIG. 14 is a perspective view of the caged nut of the attachment system according to the second embodiment.

The first step in installing the caged nut 67 that is shown alone on FIG. 14 into the bushing body 47 is to screw the cage 66 into the hole 63. Once the cage 66 is in place, it is blocked in rotation relative to the bushing body 47 by two keys 69, 71. The key 69 is then engaged in the hole 63, force fitted in the groove 68 along the AX direction. The principal effect of this is to locally shear the threads in the hole 63, such that the cage 66 can no longer be unscrewed. Similarly, the key 71 is engaged in the groove opposite the groove 68 relative to the axis of revolution AX.

At this stage, the caged nut 67 that contains the floating nut 64, is rigidly fixed to the bushing body 47, such that the assembly is ready to be mounted in the hole 51 in the shell 52.

Figure 15:
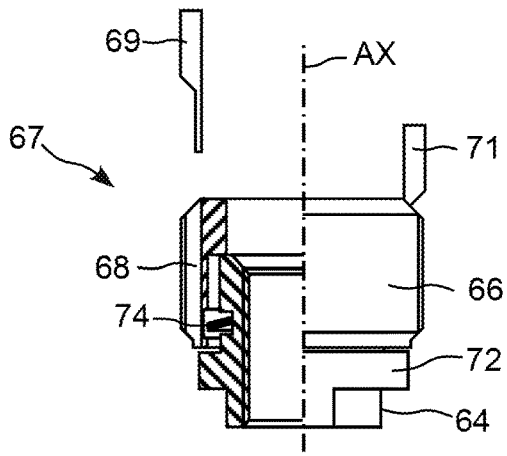
FIG. 15 is a sectional view of the caged nut of the attachment system according to the second embodiment of the invention.

As can be seen on FIG. 15, the floating nut 64 is generally tubular in shape engaged partly in the cage 66 that is also generally tubular, and it comprises an external circumferential rim 72 forming a stop, in other words that can bear on the end of the cage.

Figure 17:
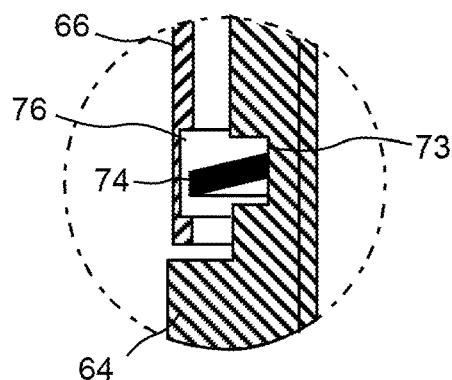
FIG. 17 is a sectional view of a detail of the caged nut of the system according to the invention.
Figure 16:
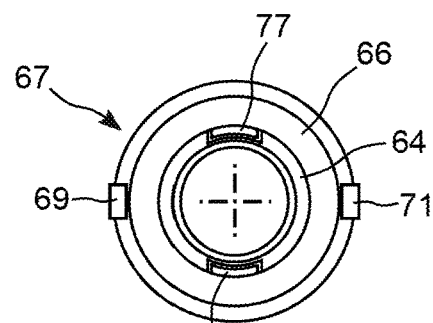
FIG. 16 is a front view of the caged nut of the attachment system according to the second embodiment of the invention.

As can be seen in the detailed view in FIG. 17, the cylindrical external face of the nut 64 comprises a circumferential groove 73 that houses a stop ring 74 with a conical shape of the Belleville washer type. The cage 66 comprises a complementary circumferential groove 76 on its internal cylindrical face, facing the groove 73. The inside and outside diameters of the stop ring 74 are such that it engages in the two grooves 73, 76 to block them in position relative to each other along the AX axis, while allowing limited mobility along this axis.

The nut 64 that is blocked in translation relative to the cage along the AX axis, is also blocked in rotation relative to this cage about this AX axis. This blocking is achieved by two pins 77, 78 of the cage 66 projecting radially inwards to be engaged in two corresponding grooves provided on the external face of this nut 64.

The floating nut 64 is installed in the cage 66 after the ring 74 has been installed in the external groove 73, and the nut is then partially engaged in the cage 66 with the ring 74 bearing in contact with the edge of this cage 66. The nut 64 is then positioned around the AX axis so that the rotation blocking pins 77 are facing its lateral grooves The nut 64 is then force fitted into the cage 77 as far as the stop ring 74, until this ring deforms elastically and fits into the groove 76.

The nut 64 thus mounted is floating in the cage 66, it is blocked in rotation about its screwing axis that coincides with the AX axis in the figures, and its mobility is limited for the remaining degrees of freedom, namely two rotations and three translations. Due to this mobility, the nut can in particular be inclined so that a screw with an orientation significantly different from the orientation of the AX axis can be fitted in it.

Figure 11:
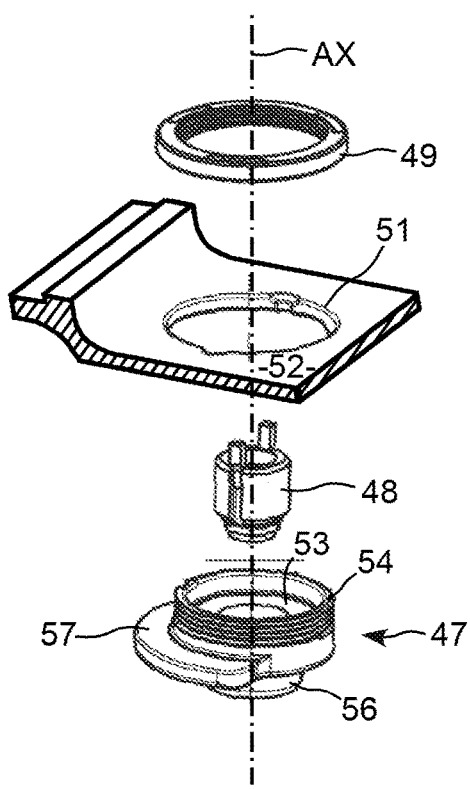
FIG. 11 is an exploded view showing the components of an attachment system according to a second embodiment of the invention and a portion of shell into which this system will be fitted.
Figure 12:
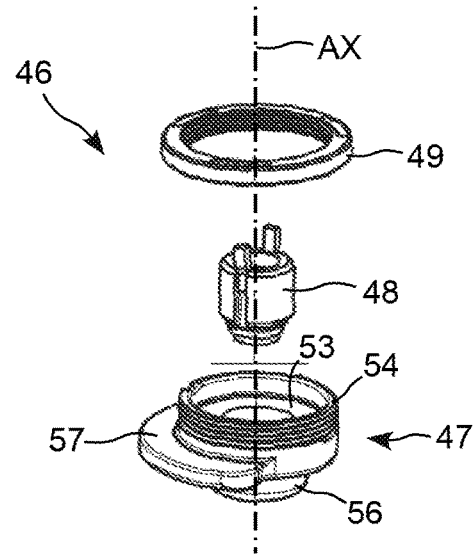
FIG. 12 is an exploded view showing the components of an attachment system according to the second embodiment of the invention represented alone.

Installation of the attachment system according to the invention into a shell 52 thus consists firstly of making a drilling 51 in the wall of this shell, as shown on FIG. 11, with a diameter corresponding to the diameter of the bushing.

When repairing an existing fastener, the hole is made around this fastener to remove this fastener and at the same time form a receptacle into which the new attachment system can be fitted to replace the existing fastener.

This bushing body is then engaged in the drilling 51 before the ring 49 screwed and tightened at its end 54 fits into it, which corresponds to the stage in FIG. 13. As can be seen on the figures, the ring 49 comprises three holes at a spacing of one hundred and twenty degrees from each other around the AX axis, designed to hold a corresponding tool with a head fitted with pins engaging into these three holes to drive this ring 49 into rotation so as to tighten it.

At this stage, the attachment system is fixed in position, so that a panel and its spacer can be put into position and a clamping screw can then be engaged through this panel and this spacer. This screw is then tightened in the nut 64, so that the panel can be completely fixed.

Thus nut is thus floating in the bushing body; functional clearances remain along the radial and axial directions between the bushing body and the nut that it encloses, so that the nut can be tilted within the bushing body and occupy the best position for the screw that fits into it, so that it can tolerate some positioning error of this screw.

Moreover, since the caged nut 67 is screwed into the portion 56 that projects from the base 53 of the bushing body, the floating nut 64 is located in the central region of the bushing body but is offset from the wall forming the shell 52 at a distance from it, like the floating nut in the original attachment. There is no reason to modify the screw that fits into it.

The attachment system according to the invention can be used to repair a damaged fastener, but as mentioned above, it can also be installed directly, on other words it can be fitted on a new engine shell.

Advantageously, a method of fastening such a panel is disclosed that is simple to install in a shell, firstly on a new engine and secondly on an existing engine to replace a damaged fastener without needing to remove the engine. Installation of the bushing in the hole in the shell is fairly easy in both of the embodiments, provided that appropriate access is available in the case of the second embodiment, for example when the shell comprises openings for the passage of a hand or a tool for gripping the bushing during its installation.

Figure 18:
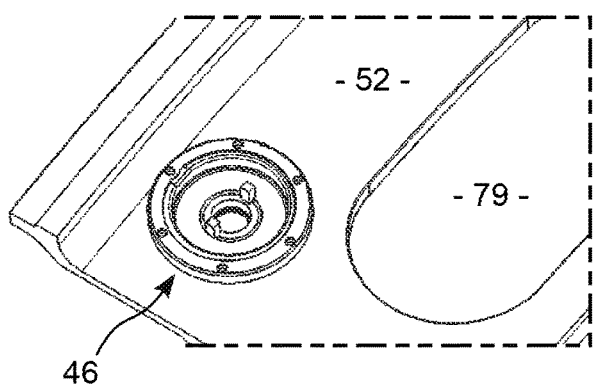
FIG. 18 is an overview showing a shell fitted with a bushing according to the second embodiment of the invention and comprising an opening providing access to the back face of this shell.

FIG. 18 shows a shell portion 52 comprising an opening 79 close to the fastener to be repaired, an operator can insert his hand inside this opening to engage a bushing body 46 in a hole, and through the back face of the shell so as to tighten the ring 49 on this bushing body to completely fix the bushing.

What is claimed is:

1. An attachment system designed to be fitted on a turbomachine wall, the attachment system comprising:
   a floating nut into which a screw in a direction normal to the wall will be fitted, the screw passing through an element to fix the element to the wall;
   a bushing comprising a bushing body supporting the floating nut, the bushing body comprising a threaded cylindrical portion to be fixed by screwing in a hole passing through the wall, the floating nut being fixed to the bushing body and prevented from rotation about a screwing axis relative to the bushing body while having limited mobility for degrees of freedom other than rotation about the screwing axis; and
   a threaded ring screwing onto the threaded cylindrical portion of the bushing body to tighten the wall of a shell between the bushing body and the threaded ring.

2. The attachment system according to claim 1, wherein the bushing body comprises an external rim that bears on a face of the wall in which the bushing body is fitted, to form a bearing for tightening the bushing body in contact with the wall.

3. The attachment system according to claim 2, wherein the threaded cylindrical portion of the bushing is provided with a self-tapping type thread.

4. The attachment system according to claim 1, wherein the bushing body comprises an internal toroidal space delimited by a bushing body wall comprising a central opening in which radial notches are formed and in which the nut comprises radial arms that can be positioned to coincide with the radial notches of the opening to engage the nut through the opening before it is partially turned to prevent axial movement inside the bushing body.

5. The attachment system according to claim 4, comprising one or several blocking pads each of which engages in a single notch of the radial notches in the bushing body to prevent the nut from rotating in the internal toroidal space in the bushing body.

6. The system according to claim 1, wherein the element is a panel.

7. An attachment system designed to be fitted on a turbomachine wall, the attachment system comprising:
   a floating nut into which a screw in a direction normal to the wall will be fitted, the screw passing through an element to fix the element to the wall;
   a bushing comprising a bushing body supporting the floating nut, the bushing body comprising a threaded cylindrical portion to be fixed by screwing in a hole passing through the wall, the floating nut being fixed to the bushing body and prevented from rotation about a screwing axis relative to the bushing body while having limited mobility for degrees of freedom other than rotation about the screwing axis; and
   a caged nut including a cage containing the floating nut, the cage being screwed into a central threaded hole in the bushing body.

8. The attachment system according to claim 7, in which the cage is prevented from rotating in the bushing body by at least one key force fitted into an external longitudinal groove in the cage, the key chiseling into the threads of the threaded hole when the key is inserted once the cage is in position in the bushing body.

9. A turbojet type aircraft engine comprising a turbomachine fitted with an attachment system according to claim 1 to hold an internal panel in position.

10. The method according to claim 7, wherein the element is a panel.

11. A method of repairing a fastener fitted on a turbomachine wall, the fastener including a nut into which a screw will be fitted in the direction normal to the wall, the screw passing through an element to fix the element to the wall, the method including the steps of:
   obtaining an attachment system according to claim 1;
   drilling a hole in the wall sized to correspond to the threaded cylindrical portion of the bushing of said attachment system; and
   fixing the bushing by screwing into the hole so that the screw can be screwed in the nut floating in said attachment system when the screw passes through the element to fix the element to the wall.

12. The system according to claim 11, wherein the element is a panel.

* * * * *